UNITED STATES PATENT OFFICE.

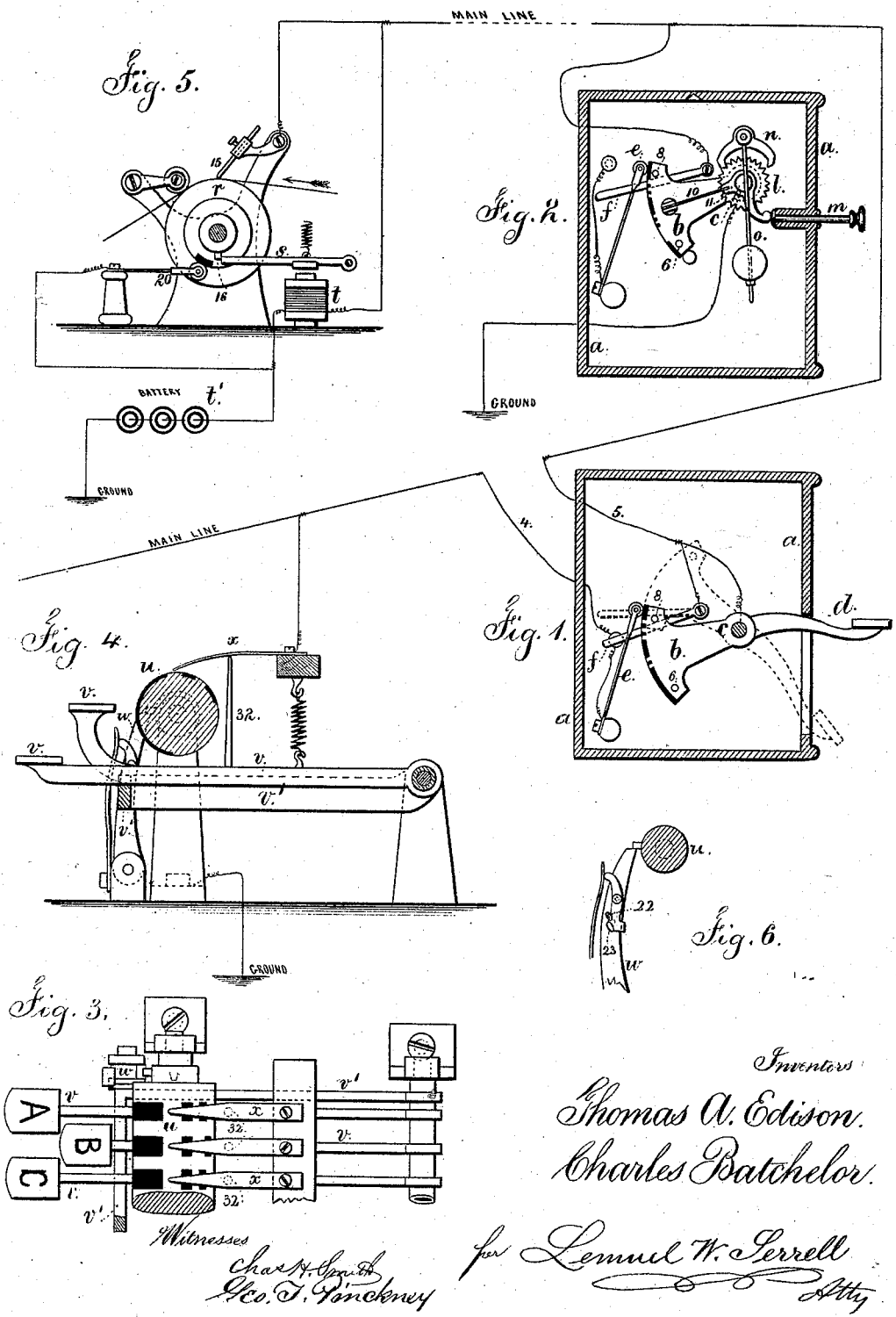

THOMAS A. EDISON AND CHARLES BATCHELOR, OF NEWARK, N. J.

IMPROVEMENT IN ELECTRIC-SIGNALING INSTRUMENTS.

Specification forming part of Letters Patent No. 169,972, dated November 16, 1875; application filed March 23, 1875.

*To all whom it may concern:*

Be it known that we, THOMAS A. EDISON and CHARLES BATCHELOR, both of Newark, in the State of New Jersey, have invented an Improvement in Electric Telegraphs; and the following is hereby declared to be a full, clear, and exact description of the same.

This telegraph apparatus is made for local or private lines, and for alarms and messenger calls, and is known as the district alarm or domestic telegraph.

An instrument adapted to such uses has to be simple, inexpensive, durable, not easily deranged or put out of working condition, and, withal, reliable in the signal sent.

We make use of a segmental weighted lever with conducting and non conducting spaces upon its surface, so that by moving the segment in contact with a circuit-closing spring or roller, the signal will be given, and the same is received at the central station by taps on a bell or sounder, or upon chemical paper. An instrument of this general character is shown in Edison's Patent No. 154,788. We use, in connection with this district telegraph, chemical paper, upon which the mark is made by electrical decomposition, as heretofore well known; and we employ in that connection automatic mechanism that sets the paper in motion, and peculiar devices for opening and closing the circuits in connection with the transmitting-segments.

As an additional convenience, a simple finger-key instrument is sometimes employed to spell out the communication letter by letter, especially upon local and private lines.

In the drawing, Figure 1 represents one of the transmitting-instruments adapted to giving a signal in one direction only as the key is restored, instead of giving it in reverse as the key is liberated, as in aforesaid patent. Fig. 2 represents the signaling-instrument with a regulator to determine the speed of movement. Figs. 3 and 4 are a partial plan and side view of the finger-key transmitter, and Fig. 5 represents the instruments at the receiving-station.

These all are shown with circuit-wire connections to illustrate the manner in which the pulsations reach the central station without interfering with other instruments.

The small box or case $a$ is adapted to being hung or fastened up against a wall, door-post, or window-frame, and within it is the segmental weight $b$, that is made to swing upon the axis or shaft $c$, and is raised by the lever or key $d$, and drops by its own weight. At the curved edge of this segment there are pieces of non-conducting material, such as hard rubber, inserted, so as to open and close the circuit through the spring $e$ when the segment is moved, and these conducting and non-conducting surfaces are such that the pulsations will be sent in the prearranged order and length to denote numbers or other signs at the receiving-station, and, in some instances, two or more of these transmitting segmental weights are employed side by side in the same instrument to send different prearranged signals. A lever-switch, $f$, is introduced between the line connections 4 and 5, so that the circuit will remain closed between 4 and 5, and no pulsation will be made as the segment $b$ is raised; but just as the segment reaches its upward movement, a pin, 6, lifts the switch $f$, and the electric circuit is broken between 4 and 5, so that the pulsations will be sent on the line as the segment $b$ descends, and opens and closes the circuit through $b$ and $e$, and the signal will thus pass to the central station. A pin, 8, restores the switch $f$ to place as the segment $b$ completes its downward movement.

The same thing is effected by the instrument, Fig. 2; but the main line is tapped by a branch circuit passing to the earth. This circuit, in a normal condition, is broken by the switch $f$, and that switch is moved by the pin 6 upon the extreme upward movement of the segment, so that the circuit will be complete through the spring $e$, segment $b$, and base of the instrument to the earth, and the pulsations will be made by the alternate conducting and non-conducting surfaces as the segment $b$ falls. At the extreme downward movement the pin 8 moves the switch and opens the branch circuit to earth.

In order to prevent a sudden movement of the segment $b$ we apply on the same shaft $c$ the ratchet-wheel $l$, that is only connected to the segment $b$ through the spring 10, and a yoke, 11, upon this ratchet-wheel is formed with a lever end, to be pressed upon by the finger or by a slide-rod, m, and there is a pallet-escapement, n, and a pendulum-vibrator, o, which is operated by the ratchet-wheel as the segment b is forced up and as it falls, and prevents too rapid movement of the segment; but the spring 10 lessens the irregular movement of the segment b, which would result if the wheel l was firmly attached to the segment b.

At the central receiving-station the instrument is provided with a drum, r, over which the strip of chemically-prepared paper passes, and upon this paper the stylus 15 rests, so that a mark will be made by the electricity as it passes, and this drum is held from revolving by the armature-lever s and stop 16.

When the circuit is closed at the sending-station the current first passes through the magnet t, attracting the armature and lever, and liberating the stop 16, so that the drum r is instantly set in motion by clock-work and a weight or spring, so that the paper will be moved along beneath the stylus 15, and be marked by the passage of the electricity. The spring 20 rests upon a non-conducting surface, so that when the drum r has made one revolution and stops with the pin 16 against the armature-lever s, the circuit through the stylus is broken, thus compelling the first pulsation to act in the magnet t. The battery is shown at t'.

The transmitting key-instrument (shown in Figs. 3 and 4) is made with a cylinder, u, the surface of which is provided with conducting and non-conducting substances in lines around the periphery, as has heretofore been used, and this is driven by clock-work when liberated by depressing one of the keys v. The key acts upon the swinging frame v' to move that down, and, by an inclined finger, 22, press back the spring-stop w, so that the cylinder u will be liberated and revolved by the clock-work, and then the stop springs back to place upon the upward movement of the frame v', and its finger 22 passes behind a spring projection, 23, on w, (see Fig. 6,) so that the stop w remains in place to prevent more than one revolution of the cylinder u.

One wire of the line passes to the journals of the cylinder u, and the other to the range of transmitting-springs x, and these are held up from the surface of the cylinder by the non-conducting studs 32; but when a key is depressed its spring x rests upon the surface of the cylinder, and as the latter revolves the pulsations of electricity are made to indicate the letter of the key.

We claim as our invention—

1. The combination, with the segmental circuit-closing weight, of the switch f, for the purposes set forth.

2. The combination, with the circuit-closing segmental weight, of the ratchet-wheel l, escapement n, pendulum o, and spring 10, for the purposes set forth.

3. The receiving-instrument, composed of a drum and stylus for chemical paper, and electro-magnet and armature-lever stop, and a circuit-closer insulated from the drum when the parts are at rest, for the purposes set forth.

4. The combination, with the circuit-closing cylinder u and keys v, of the springs x, held up by the studs 32, and the stop w, actuated by the frame v', substantially as set forth.

Signed by us this 24th day of February; A. D. 1875.

THOS. A. EDISON.
CHAS. BATCHELOR.

Witnesses:
  GEO. T. PINCKNEY,
  CHAS. H. SMITH.